Feb. 6, 1934.                G. SCARPA                 1,945,917
              INSULATION OF LEADS TO ELECTRICAL CONDENSERS
                         Filed Jan. 20, 1931

Inventor
Giuseppe Scarpa

By Lacey & Lacey
                Attorneys

Patented Feb. 6, 1934

1,945,917

UNITED STATES PATENT OFFICE 1,945,917

INSULATION OF LEADS TO ELECTRICAL CONDENSERS

Giuseppe Scarpa, Savona, Italy

Application January 20, 1931, Serial No. 510,044, and in Great Britain January 21, 1930

2 Claims. (Cl. 173—318)

This invention relates to improvements in the insulation of leads to electrical condensers.

With the object of increasing the effectiveness of the insulation of such leads it is usual to employ concentric layers of insulating material alternating with thin layers or armatures of progressively increasing length.

In practice this system has one serious drawback in that the terminal edges of the armatures offer a much lower resistance to the leakage of electricity at high tension than the other parts of the insulation in view of the acute angle between the ends of the successive armatures and the sharpness of the edges of the armatures which have an effective radius of practically zero.

The object of my invention is to improve the effectiveness of this type of insulation by eliminating or greatly reducing the possible losses at the ends of the armatures.

According to my invention the end edges of the armatures are provided with a wire ring of substantial radius in electrical connection with the armature or are otherwise rounded off in such a way as to eliminate or effectively reduce the edge effect at ends of the armatures.

Some practical forms of my invention are illustrated diagrammatically by way of example in the accompanying drawing in which:—

Figure 2:
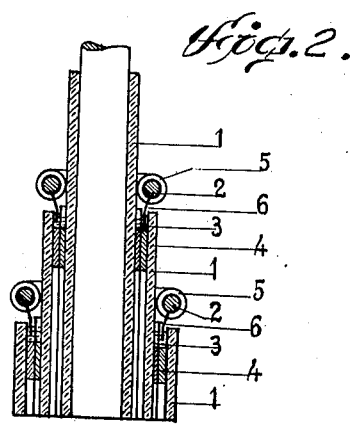
Figure 2 is a sectional view showing a slight modification of the invention.
Figure 1:
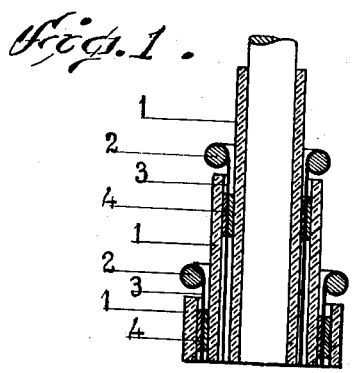
Figure 1 is a sectional view of a heavy-duty insulator with oil-filled insulating rings.

In the heavy-duty insulator illustrated in Figure 1 there is an annular space for oil to circulate between the successive layers of insulating material, and the armatures consist of rigid metal tubes which depend into these spaces and which are immersed on both sides in the oil 4. At the end of each armature is arranged the ring 2 of comparatively large radius to prevent leakage losses. If the radius found necessary for the ring 2 to give the desired effect is found to be excessive, it can be substantially reduced by inclining the edge of the armature outwardly as shown at 6 in Figure 2 and by enclosing the ring in a wrapping of insulating material as shown at 5. Care should be taken to choose a material having a specific inductance higher than that of the oil employed.

Having now particularly described and ascertained the nature of my said invention, and in what manner the same is to be performed, I declare that what I claim is:—

1. A lead for electric condensers consisting of concentric tubes of insulation slightly spaced apart, oil in the spaces between said tubes, concentric conductor tubes alternating with the insulation tubes and immersed in the oil, and metal rings of circular cross section adjacent the ends of the insulation tubes, the ends of the conductor tubes wrapping around the respective rings and being turned away from the tubes of insulation whereby brush discharge from said tubes may be eliminated.

2. A lead for electric condensers consisting of concentric tubes of insulation, concentric conductor tubes alternating with the tubes of insulation, oil fillings between the tubes, metal rings of circular cross section adjacent the ends of the insulation tubes, the ends of the conductor tubes being inclined outwardly away from the tubes of insulation and attached to the respective rings, and coverings of insulation on each of the rings.

GIUSEPPE SCARPA.